(12) United States Patent
Salter et al.

(10) Patent No.: US 11,708,714 B2
(45) Date of Patent: Jul. 25, 2023

(54) VEHICLE HAVING DOOR WITH OBSTACLE AVOIDANCE

(71) Applicant: Ford Global Technologies, LLC, Dearborn, MI (US)

(72) Inventors: Stuart C. Salter, White Lake, MI (US); Kristopher Karl Brown, Dearborn, MI (US); Howard Paul Tsvi Linden, Southfield, MI (US); Heather Woycik, Ferndale, MI (US); John Robert Van Wiemeersch, Novi, MI (US); Hussein H. Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 17/394,545

(22) Filed: Aug. 5, 2021

(65) Prior Publication Data

US 2023/0041503 A1 Feb. 9, 2023

(51) Int. Cl.
*E05F 15/40* (2015.01)
*B60J 5/04* (2006.01)
*E05F 15/60* (2015.01)
*E05F 15/75* (2015.01)
*G01G 9/00* (2006.01)
(Continued)

(52) U.S. Cl.
CPC ............. *E05F 15/40* (2015.01); *B60J 5/04* (2013.01); *E05F 15/60* (2015.01); *E05F 15/75* (2015.01); *G01G 9/00* (2013.01); *G01G 19/08* (2013.01); *E05F 2015/763* (2015.01); *E05F 2015/765* (2015.01); *E05F 2015/767* (2015.01); *E05Y 2201/434* (2013.01); *E05Y 2400/40* (2013.01); *E05Y 2400/44* (2013.01); *E05Y 2400/54* (2013.01); *E05Y 2900/531* (2013.01)

(58) Field of Classification Search
None
See application file for complete search history.

(56) References Cited

U.S. PATENT DOCUMENTS

| 8,442,755 | B2 | 5/2013 | Kollar et al. |
| 10,643,085 | B1* | 5/2020 | Kim ...................... G06F 18/213 |
| 2018/0075565 | A1 | 3/2018 | Myers et al. |

(Continued)

FOREIGN PATENT DOCUMENTS

CN 107839594 B 10/2020

*Primary Examiner* — Marcus Menezes
(74) *Attorney, Agent, or Firm* — Frank Lollo; Price Heneveld LLP (57) ABSTRACT

A vehicle having powered door assist includes a plurality of powered doors, each powered door having an actuator for moving the door between closed and open door positions, and a plurality of sensors located on the vehicle for sensing objects proximate to the vehicle including one or more potential passengers expected to enter the vehicle and for sensing an obstacle within or proximate to a swing path of at least one of the plurality of powered doors. The vehicle also includes a controller determining an estimated weight of the one or more potential passengers, detecting expected height of the plurality of powered door with the estimated weight added to the vehicle, detecting height of a sensed obstacle within the swing path of one of the powered doors and determining whether the expected height of the one powered door will interfere with the sensed obstacle in the swing path.

20 Claims, 5 Drawing Sheets

(51) Int. Cl.
  *G01G 19/08*   (2006.01)
  *E05F 15/73*   (2015.01)

(56) References Cited

U.S. PATENT DOCUMENTS

| | | | |
|---|---|---|---|
| 2019/0226265 A1* | 7/2019 | Ahmad | G05B 19/416 |
| 2020/0023811 A1* | 1/2020 | Herman | B60R 25/01 |
| 2020/0300027 A1* | 9/2020 | Brown | B60J 5/047 |
| 2020/0386035 A1* | 12/2020 | Battlogg | B60Q 9/008 |
| 2022/0306123 A1* | 9/2022 | Hanson | G06V 20/597 |

* cited by examiner

VEHICLE HAVING DOOR WITH OBSTACLE AVOIDANCE

FIELD OF THE DISCLOSURE

The present disclosure generally relates to control of vehicle powered doors, and more particularly relates to a system and method of controlling a vehicle or vehicle doors to avoid interference of the door swing path with an obstacle.

BACKGROUND OF THE DISCLOSURE

Motor vehicles are commonly equipped with various closure doors to allow ingress and egress of the vehicle passenger compartment. The closure doors may be powered with electric motors which operate to open and close the doors. It would be desirable to provide for control of the powered doors in a manner that avoids interference with an obstacle.

SUMMARY OF THE DISCLOSURE

According to a first aspect of the present disclosure, a vehicle having door assist is provided. The vehicle includes a door movable along a path between closed and open door positions, a plurality of sensors located on the vehicle for sensing objects proximate to the vehicle including one or more objects indicative of one or more potential passengers expected to enter the vehicle and for sensing an obstacle within the path of the door, and a controller processing sensed signals generated by the plurality of sensors, determining an estimated weight of the one or more potential passengers expected to enter the vehicle, determining an expected clearance height of the door with the estimated weight added to the vehicle, detecting height of the sensed obstacle within the path of the door, determining whether the door is expected to sense an obstacle in the path, and generating an output based on the expected contact.

Embodiments of the first aspect of the disclosure can include any one or a combination of the following features:
 the controller determines the estimated weight of the one or more passengers by processing one or more images acquired with an imaging device and comparing the one or more images with size parameters to determine the estimated weight of the one or more potential passengers expected to enter the vehicle;
 the output provides instructions for the potential passengers to enter the vehicle from another door that is clear of the obstacle;
 the output includes instruction for a driver of the vehicle to reposition the vehicle when interference of the door with the obstacle is expected;
 the plurality of sensors comprises at least one of an ultrasonic sensor, radar sensor and an imaging camera;
 the door comprises a powered door having an actuator, wherein the powered door pivots about a hinge assembly along a swing path;
 the vehicle comprises a plurality of powered doors;
 the actuator comprises an electric motor; and
 the controller further determines a location of the one or more potential passengers and actuates the powered door to an open position when the at least one potential passenger attempts to enter the vehicle.

According to a second aspect of the present disclosure, a vehicle having powered door assist is provided. The vehicle includes a plurality of powered doors, each powered door having an actuator for moving the door between closed and open door positions, a plurality of sensors located on the vehicle for sensing objects proximate to the vehicle including one or more objects indicative of one or more potential passengers expected to enter the vehicle and for sensing an obstacle within a swing path of at least one of the plurality of powered doors and generating sensed signals. The vehicle having powered door assist also includes a controller processing the sensed signals generated by the plurality of sensors, determining an estimated weight of the one or more potential passengers expected to enter the vehicle, detecting expected height of the plurality of powered doors with the estimated weight added to the vehicle, detecting height of a sensed obstacle within the swing path of one of the powered doors and determining whether the one powered door will contact the sensed obstacle in the swing path, wherein the vehicle determines the estimated weight of the one or more potential passengers by processing one or more images acquired with an imaging device and comparing the one or more images with size parameters to determine the estimated weight of the one or more passengers, the controller generating an output based on the expected contact.

Embodiments of the second aspect of the disclosure can include any one or a combination of the following features:
 the output includes instructions for the potential passengers to enter the vehicle from another door that is clear of the obstacle;
 the output includes instruction for a driver of the vehicle to reposition the vehicle when interference on the one powered door with the obstacle is expected;
 the plurality of sensors comprises at least one of an ultrasonic sensor, radar sensor and an imaging camera;
 the powered doors comprise passenger doors that pivot about a hinge assembly;
 the actuator comprises an electric motor; and
 the controller further determines a location of the one or more potential passengers and actuates at least one of the powered doors to an open door position when the at least one potential passenger attempts to enter the vehicle.

According to a third aspect of the present disclosure, a method of assisting a vehicle having a powered door is provided. The method includes the steps of providing a plurality of powered doors, each powered door having an actuator for moving the door between closed and open door positions, sensing with a plurality of sensors located on the vehicle objects proximate to the vehicle including one or more objects indicative of one or more potential passengers expected to enter the vehicle and for sensing an obstacle within a path of at least one of the plurality of powered doors, processing with a controller the sensed signals generated by the plurality of sensors, determining an estimated weight of the one or more potential passengers expected to enter the vehicle, detecting an expected height of the at least one of the plurality of powered doors with the estimated weight added to the vehicle, detecting height of a sensed obstacle within the path of the at least one of the plurality of powered doors and determining whether the at least one of the plurality of powered doors is expected to contact the sensed obstacle in the path, wherein the vehicle determines the estimated weight of the one or more potential passengers by processing one or more images acquired with an imaging device and comparing the one or more images with size parameters to determine the estimated weight of the one or more potential passengers, and providing an output based on the expected contact.

Embodiments of the third aspect of the disclosure can include any one or a combination of the following features:
   the output includes instructions for the one or more potential passengers to enter the vehicle from another door that is clear of the obstacle;
   the output includes instruction for a driver of the vehicle to reposition the vehicle when contact is expected; and
   the plurality of sensors comprises at least one of an ultrasonic sensor, radar sensor and an imaging camera.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
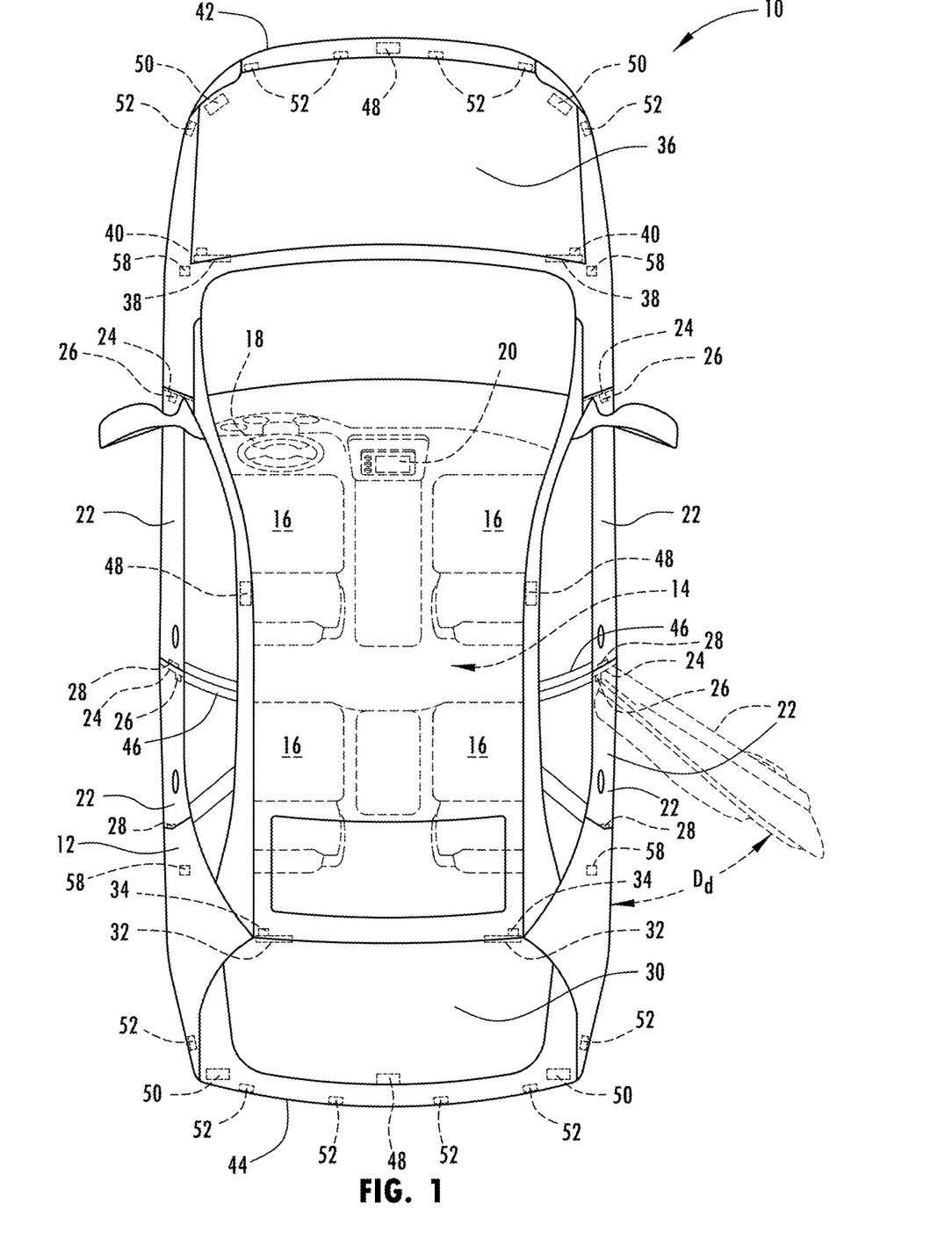
FIG. 1 is a top schematic view of a motor vehicle equipped with powered doors and controls for preventing interference of the doors with an obstacle, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having powered doors with obstacle avoidance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated having a cabin interior 14 defined by a vehicle body 12 and configured with passenger seating for transporting passengers in the vehicle 10. The cabin interior 14 is generally defined by the vehicle body 12 and may include various features and trim components within the cabin interior 14. The cabin interior 14 may include an arrangement of passenger seats 16 including a first or front row of driver and passenger seats generally located towards the front of the cabin interior 14 and one or more rows of passenger seats located rearward of the front row of passenger seats. The vehicle 10 may be equipped with a steering wheel 18 located in front of the driver seat to enable the driver to steer the vehicle road wheels. Additionally, one or more human machine interfaces (HMI), such as a touchscreen display 20, audio speakers, microphone, etc., may be provided on the vehicle 10 to communicate with the driver and one or more passengers in the vehicle 10.

The vehicle 10 is equipped with powered doors and door interference detection and avoidance to assist with operation of the doors of the vehicle 10 and allow passengers to enter the vehicle 10. The vehicle 10 has a plurality of powered closure doors that include four side passenger doors 22, with two doors on each opposite lateral side of the vehicle 10. In addition, the vehicle 10 has a powered rear trunk door 30 at the rear of the vehicle 10 and a powered front trunk door 36 at the front of the vehicle 10. Each of the powered doors 22, 30 and 36 may close a space such as a space of the cabin interior 14 in the closed position and allow access to the cabin interior 14 in an open position. The powered doors 22, 30 and 36 are power-operated doors, each having an actuator, such as an electric motor, for moving the corresponding door between the closed and open door positions. The actuators may move the powered doors between the open and closed door positions in response to a user input, such as an input entered on a vehicle mounted switch panel, a key fob, a smartphone or other electronic device. Additionally, the powered doors may be opened and closed by the actuators in response to detecting movement or position of a driver or potential passenger approaching or departing the vehicle 10. Additionally, the powered doors may reverse direction after receiving a motion command if a vertical obstacle is detected.

It should be appreciated that the vehicle 10 may include additional rows of seating and powered doors, such as may be found on large SUVs, vans and buses. For example, the vehicle 10 may include two side doors or more than four side doors. The vehicle 10 may be a motor vehicle, such as a wheeled car, truck, SUV, van or bus, for example, having one or more powered doors. Each of the powered doors moves relative to the body 12 of the vehicle 10 between a closed door position and an extended open door position and therefore requires space to move between the closed and open door positions. The vehicle controls advantageously assist with operation of the powered doors and/or the vehicle 10 in a manner to prevent interference with one or more obstacles that may contact the powered doors on the vehicle 10 as the corresponding doors attempt to move between the open and closed door positions.

The vehicle 10 is shown in FIG. 1 having four side powered doors 22, with two of the side doors 22 located forward and adjacent to the front row of seats 16 and the other two of the side doors 22 located rearward thereof and adjacent to the second or rear row of seats 16. Each of the side doors 22 may include a door panel and window that pivots about hinges 24 generally along a vertical axis to allow the door 22 to swing outward through a swing path to an open door position or inward to a flush position with the body 12 of the vehicle 10 where it may be latched via latch 28 in the closed door position. The side doors 22 each includes an actuator such as an electric motor 26 which may be located at or near one of the hinges 24 to power actuate the powered door 22 between the closed and open door positions.

The vehicle 10 is equipped with a plurality of sensors that are located and oriented on the vehicle 10 for sensing objects such as potential passengers expected to enter the vehicle 10 and obstacles outside of the vehicle 10 and within a space surrounding the vehicle 10. The plurality of sensors generate signals indicative of the sensed objects. The plurality of sensors may include a plurality of imaging devices, such as two side view cameras 48, which are shown located on opposite lateral sides of the vehicle 10 shown at or near the B-pillars 46, a front view camera 48 shown in a front fascia 42 of the vehicle 10 and a rear view camera 48 shown in a rear fascia 44 of the vehicle 10. Each of the cameras 48 may acquire images of the space around the perimeter of the vehicle 10, particularly covering the swing path of the powered doors. The acquired images may be processed by video processing to identify the objects and the position of the objects relative to the vehicle 10.

The plurality of sensors may also include radar sensors 50 shown located at each of the four corners of the vehicle 10 for sensing objects located outside of the vehicle and within the space surrounding the vehicle 10. The radar sensors 50 transmit radio waves and process their reflections from objects to determine distance to the object and location of the object. Further, the plurality of sensors may include a plurality of ultrasonic sensors 52 shown located at various locations along the front portion and rear portions of the vehicle 10. In the examples shown, six ultrasonic sensors 52 are shown spaced apart and located at or proximate to the rear fascia 44 and six ultrasonic sensors 52 are shown spaced apart and located at or proximate to the front fascia 42. As such, the radar and ultrasonic sensors 50 and 52 may detect the location, size and relative distance from the vehicle 10 to the detected objects. It should be appreciated that other sensors may be employed by the vehicle 10 to sense objects relative to the vehicle 10, including objects within the swing path of the powered doors, and generate sensed signals that may be used to identify each object and the distance and location of the sensed object relative to the vehicle 10 for use in assisting with the operation of the vehicle 10 and the powered doors of the vehicle 10.

Figure 2:
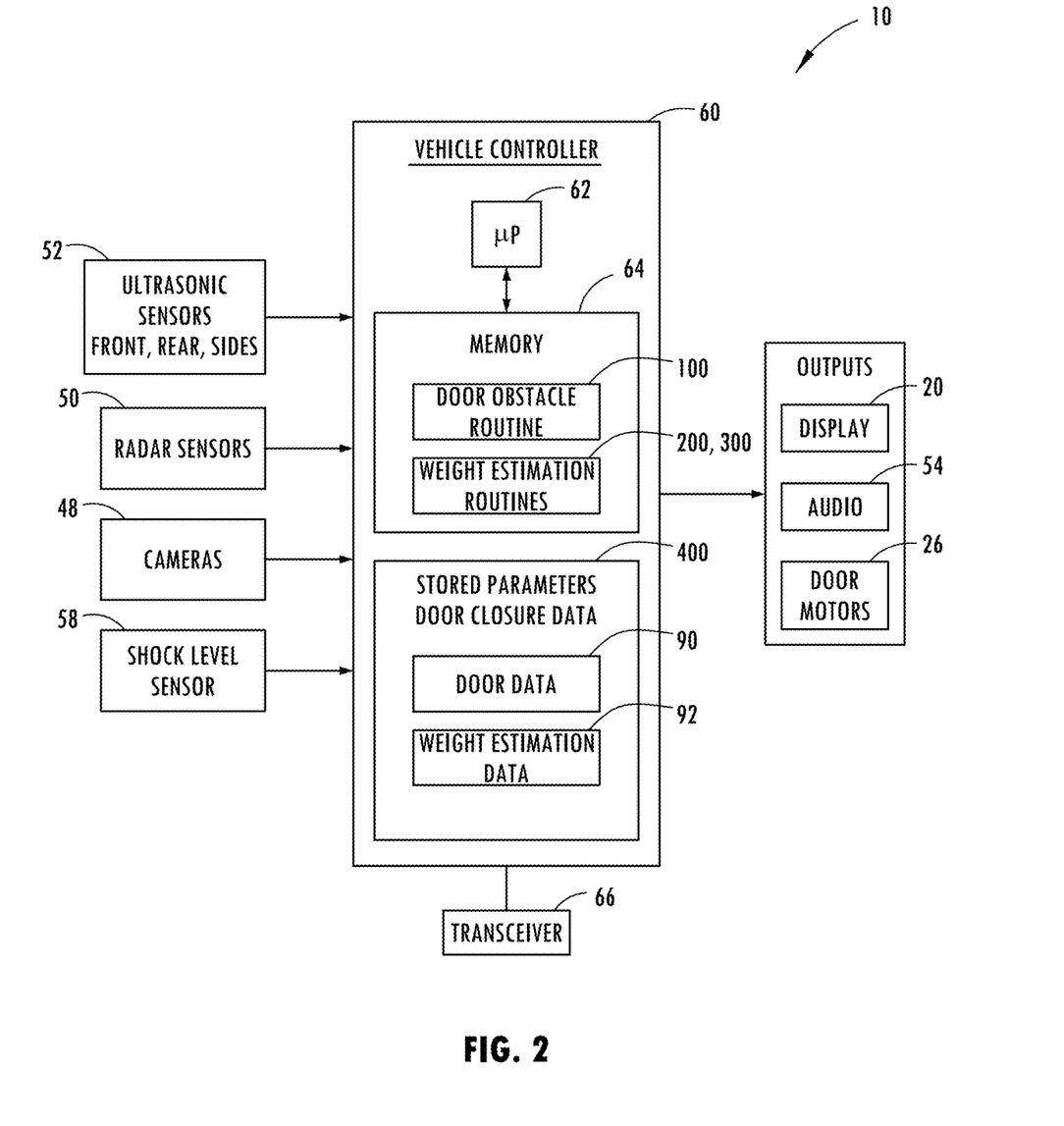
FIG. 2 is a block diagram of the vehicle controller configured to detect interference of a powered door with an obstacle and output countermeasures.

Referring to FIG. 2, the vehicle 10 is shown having a vehicle controller 60. The vehicle controller 60 may include control circuitry, such as a microprocessor 62 and memory 64. It should be appreciated that the vehicle controller 60 may be comprised of analog and/or digital control circuitry. Stored in memory 64 are door obstacle routine 100 and weight estimation routines 200 and 300 which may be executed by the microprocessor 62. In addition, various stored parameters 400 may be stored in memory 64 and processed by the microprocessor 62. The stored parameters 400 may include powered door data 90 including dimensions for each powered door on the corresponding vehicle, including the distance extended outward from the vehicle body 12 and throughout the door swing path as the door moves between the closed and open door positions and the height of the open door including the clearance height between the bottom edge of the door and the ground (e.g., roadway or curb or parking block) for different vehicle load weights. The vehicle controller 60 receives inputs from the plurality of sensors located on the vehicle 10 including the cameras 48, radar sensors 50 and ultrasonic sensors 52. In addition, the vehicle controller 60 generates one or more outputs which may serve as countermeasures and provides the outputs to one or more HMIs such as the touchscreen display 20 and audio speakers 54 located on the vehicle 10 and to the door motors 26. The one or more outputs may serve to actuate an actuator to raise the height of a hydraulic suspension in an attempt to clear the obstacle.

The stored parameters 400 may also include weight estimation data 92 which may be processed to estimate the load weight of one or more potential passengers that are expected to enter the vehicle 10. The load weight added to the vehicle by one or more expected passengers is used to determine a change in height of the vehicle and hence the height of the powered doors. As load weight is added to the vehicle 10, the height of the vehicle 10 and powered doors 22 may decrease as the added load causes the vehicle suspension, e.g., shocks, to compress and the vehicle 10 to drop in height. When this occurs, the added load decreases the clearance height of the powered doors such that the doors may contact or be interfered by an obstacle such as a roadway curb, for example. If the vehicle controller determines such interference is expected to occur when one or more expected passengers having a sufficient estimated weight enter the vehicle, the vehicle controller may generate an output to prevent movement of the powered doors, to deny access to the potential passengers attempting to enter the vehicle, to command the driver to reposition the vehicle in a position that does not interfere with the obstacle or perform other countermeasures or actions. The expected increase in load weight may be estimated based on processed sensor signals compared to known weights of known dimensions of passengers, according one embodiment. For example, by measuring the height, width, depth and other dimensions of each potential passenger or portions thereof, and comparing the dimensions to known dimensions having known weight, the estimated weight can be determined. The load increase could also be estimated by measuring the height level of one or more vehicle shocks or other suspension component with a shock level sensor before and after the potential passengers have entered the vehicle. By comparing the before and after measurements, the estimated weight can be completed.

The controller 60 provides outputs to each of the electric motors 26 associated with the side powered doors 22. As such, the controller 60 may control actuation of the side powered doors 22 between the open and closed door positions. In the event that an obstacle is detected in the swing path of a powered door 22 when one or more potential passengers or other loads are expected to enter the vehicle such that the powered door may contact the obstacle, the controller may prevent the side powered door 22 from moving. For example, the side powered door 22 may be prevented from moving from the closed door position to the open door position. The controller 60 may also provide an output to an HMI commanding the driver of the vehicle 10 to locate to a new position away from the obstacle before opening the powered door(s) 22 to allow the potential passengers to enter the vehicle or instructing the expected passengers to enter the vehicle via another door that is not obstructed.

The vehicle controller 60 may further communicate data via a transceiver 66. Transceiver 66 may communicate with other vehicles and fixed transceivers to acquire new or updated data and may further communicate with potential passengers via personal electronic devices.

Figure 3:
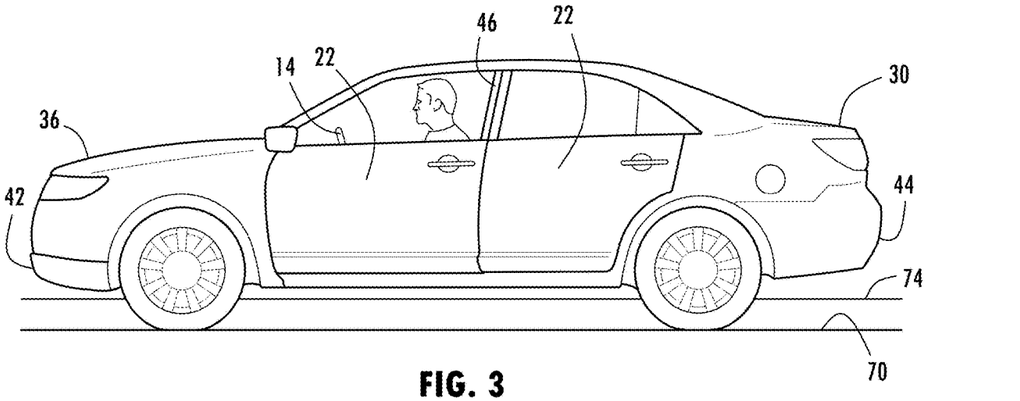
FIG. 3 is a side view of a vehicle showing a driver and available seating to accept passengers.
Figure 4:
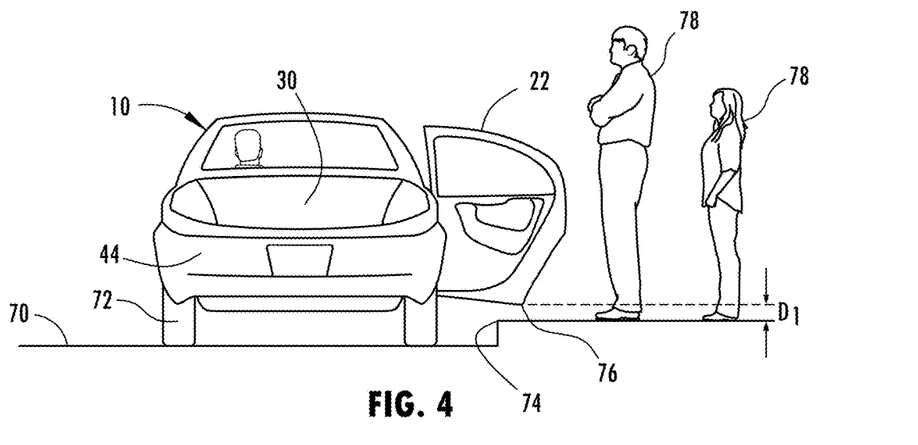
FIG. 4 is a rear view of the vehicle showing one of the powered doors in an open door position without any obstruction and potential passenger(s) ready to enter the vehicle, according to one example.
Figure 5:
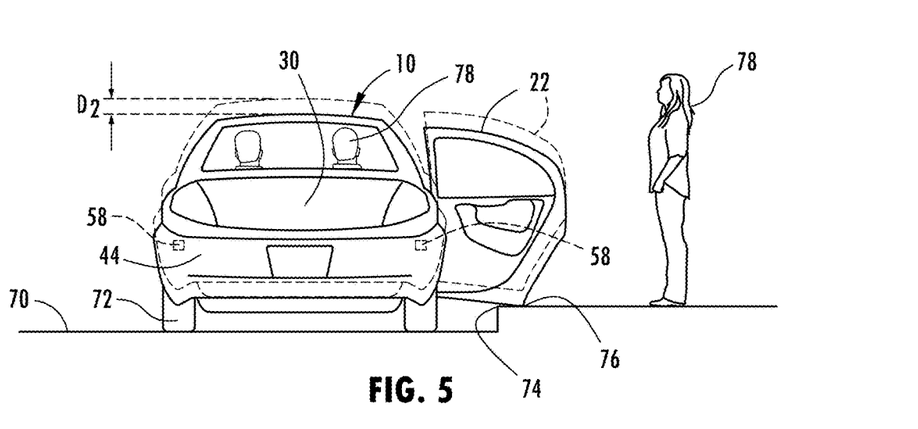
FIG. 5 is a rear view of the vehicle showing the powered door in the open door position in contact with an obstacle after a passenger enters the vehicle, according to one example.

Referring to FIGS. 3-5, the vehicle 10 is shown having one of the side powered doors 22 in an open door position adjacent to an obstacle 74 shown as a roadside curb which may be a raised sidewalk adjoining a roadway 70, for example. The vehicle 10 shown in FIGS. 3 and 4 has a driver seated in the driver seat and has empty passengers seats configured to accommodate one or more passengers. Potential passengers 78 expected to enter the vehicle 10 are shown in FIG. 4 approaching the vehicle 10. The vehicle controller 60 monitors the presence of potential passengers 78 expecting to enter such as approaching the vehicle 10 and determines an estimated load weight of the passengers expected to enter the vehicle 10. The estimated load weight may be determined based on size dimensions of each passenger, e.g., person, compared to known size dimensions and load weights stored in memory. The vehicle controller then utilizes the estimated load weight of the potential passenger(s) expected to enter the vehicle 10 to predict whether the vehicle suspension and hence the vehicle body 12 and powered doors 22 will drop by a height $D_2$ sufficient such that the lower edge 76 of door 22 may come into contact with the obstacle 74 when the potential passengers enter the vehicle 10 as seen in FIG. 5. The vehicle 10 is shown in FIG. 4 with the open powered door 22 having a clearance height $D_1$ above the obstacle. If the estimated weight of the potential passenger(s) causes the vehicle body 12 and powered door 22 to lower such that height $D_2$ exceeds height $D_1$, then the obstacle is expected to interfere with the powered door 22. When the vehicle controller determines that the vehicle powered door 22 will come into contact with obstacle 74, the vehicle controller 60 generates an output which may be used to prevent the powered door 22 from opening to thereby avoid the contact or to instruct the driver of the vehicle 10 to relocate the vehicle 10 to a position that does not have door interference or to instruct the potential passenger(s) to enter via another door that is unobstructed.

While the example shown herein includes a driver of the vehicle 10, it should be appreciated that the vehicle 10 may be an autonomous vehicle or a semi-autonomous vehicle. Also, while the example shown estimates the load weight of an expected load by estimating weight of one or more passengers in the form of people, the estimated load may also include other expected loads, such as pets and inanimate objects such as luggage, purses, backpacks, etc.

Figure 6:
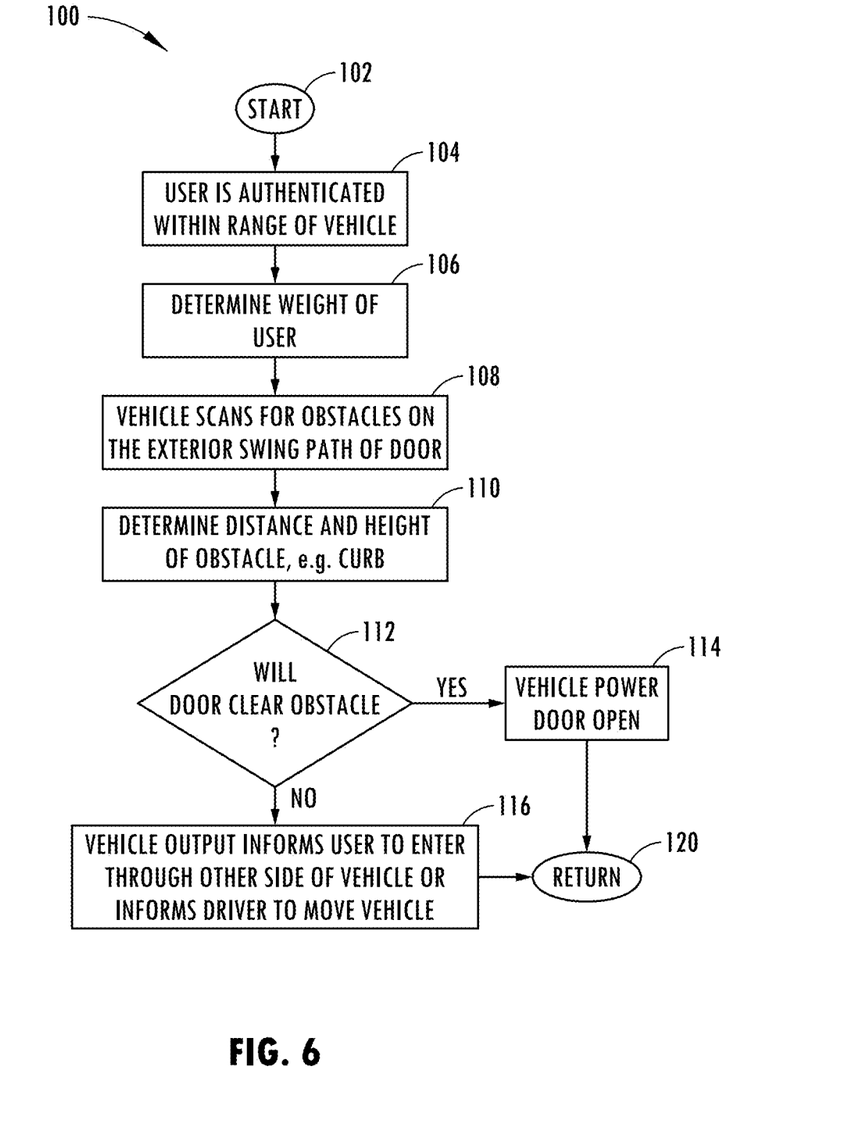
FIG. 6 is a flow diagram illustrating a routine for detecting expected passenger(s) and the potential interference of a door with an obstacle and generating a countermeasure output.

Referring to FIG. 6, a routine 100 for monitoring and estimating the weight of an expected load and determining expected interference of a powered door with an obstacle and generating an output as a countermeasure is illustrated, according to one example. The routine 100 starts at step 102 and proceeds to step 104 to authenticate that a user which may include one or more potential passengers expected to enter the vehicle is within range of the vehicle. This may include verifying that the user is within range of the vehicle sufficient to sense the user with the sensors. Next, at step 106, the routine 100 via the controller determines the estimated load weight of one or more potential passengers that are expected to enter the vehicle. The estimated load weight may be determined based on a change in the measured vehicle shock level for passengers already located on the vehicle as shown by routine 200 in FIG. 7. For passengers expected to board the vehicle, the estimated weight may be determined by processing images capturing the potential passengers outside the vehicle and sensed signals from the plurality of sensors sensing the potential passengers as shown by routine 300 in FIG. 8.

Once the estimated passenger load weight is determined, routine 100 proceeds to step 108 to scan for one or more obstacles on the exterior space outside the vehicle within the swing path of the powered doors. This may be achieved by capturing images of obstacles proximate to the exterior side of the powered doors, recognizing the images with image recognition by comparing the images to images of known objects, and measuring dimensions including distance measurements of the distance from the vehicle door and height of the object with the use of the plurality of sensors. In step 110, the distance and height of an obstacle shown as a roadside curb is determined. The routine 100 then compares the expected height and swing path of the powered door to the distance and height of the obstacle and decides whether the powered door will clear the obstacle without interference. If the door is expected to clear the obstacle without interference or contact with the expected load weight added to the vehicle, then routine 100 generates an output signal commanding the powered door to be actuated to the open door position before returning at step 120.

If routine 100 determines that the powered door is not expected to clear the obstacle without interference or contact, then routine 100 proceeds to step 116 to generate an output based on the expected interference. The output may include informing the potential passengers to enter the vehicle through another side door of the vehicle that does not have door interference. The output may include informing the driver to move the vehicle to a location that avoids door interference. The output may also be used to command the affected powered door to remain closed and not move to the open door position due to the expected interference.

Figure 7:
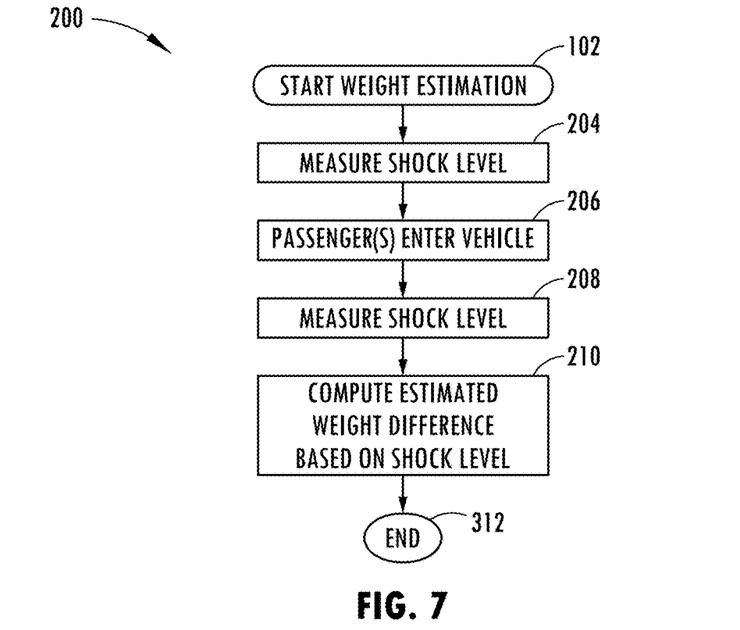
FIG. 7 is a flow diagram illustrating a routine for estimating the load weight of one or more potential passengers approaching the vehicle, according to one embodiment.

Routine 200 is illustrated in FIG. 7 for determining estimated weight of one or more passengers after they have entered the vehicle. This may be beneficial in a situation where passengers are desirous of opening a door to exit the vehicle and the door swing may be interfered with an obstacle or when the door is fully open and the passengers enter the vehicle and the door becomes susceptible to interference on the door closing path. At step 204, routine 200 measures the vehicle shock level or other vehicle suspension level or vehicle body height with a sensor prior to the passengers entering the vehicle. Thereafter, the passenger(s) enter the vehicle at step 206. Next, routine 200 measures the vehicle shock level or other vehicle suspension level or vehicle body height at step 208. At step 210, routine 200 computes an estimated weight difference based on the shock level measurement before and after the passengers enter the vehicle. Routine 200 then ends at step 212.

Figure 8:
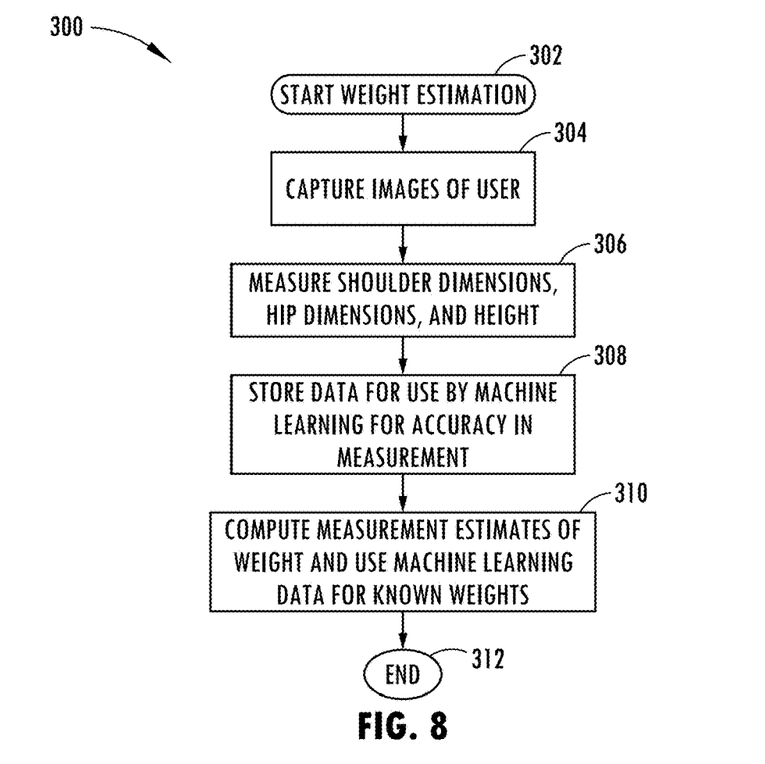
FIG. 8 is a flow diagram illustrating a routine for estimating the weight of one or more passengers on board the vehicle, according to one embodiment.

Routine 300 is illustrated in FIG. 8 for determining estimated weight of one or more potential passengers expected to enter the vehicle. Routine 300 starts at step 302 and proceeds to step 304 to capture images of the expected one or more passengers approaching or positioned near a powered door of the vehicle. The images may be captured with one or more cameras. Next, at step 306, routine 300 measures dimensions of the one or more passengers including, for example, shoulder width dimensions, hip width dimensions and height dimensions of each passenger. The measured dimensions may be computed by processing the captured images and the sensed signals from the other sensors including the radar sensors and ultrasonic sensors.

The measured dimension data may be stored in memory and may be further processed with machine learning to enhance the accuracy of the weight estimation in step 308. Routine 300 may compute measurements for weight estimation and use the machine learning data for known weights in step 310. By using known weights and corresponding dimension sizes, the routine 300 is able to use the measurements to estimate the load weight of each passenger. The estimated load weight is then useful for determining the vehicle body and door height. Routine 300 then ends at step 312.

The vehicle 10 advantageously monitors and determines estimated load weight of one or more potential passengers expected to enter the vehicle and determines whether an obstacle may interfere with the powered door movement. The vehicle 10 may prevent the interference with an obstacle prior to the potential passengers entering the vehicle 10 and may provide one or more countermeasure outputs to avoid the interference.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle having door assist, the vehicle comprising:
   a door movable along a path between closed and open door positions;
   a plurality of sensors located on the vehicle for sensing objects proximate to the vehicle including one or more objects indicative of one or more potential passengers expected to enter the vehicle and for sensing an obstacle within the path of the door; and
   a controller processing sensed signals generated by the plurality of sensors, determining an estimated weight of the one or more potential passengers expected to enter the vehicle, determining an expected clearance height of the door with the estimated weight added to the vehicle, detecting height of the sensed obstacle within the path of the door, determining whether the plurality of sensors are expected to sense an obstacle in the path of the door, and generating an output based on the sensed obstacle expected to contact the door.

2. The vehicle of claim 1, wherein the controller determines the estimated weight of the one or more passengers by processing one or more images acquired with an imaging device and comparing the one or more images with size parameters to determine the estimated weight of the one or more potential passengers expected to enter the vehicle.

3. The vehicle of claim 1, wherein the output provides instructions for the one or more potential passengers to enter the vehicle from another door that is clear of the obstacle.

4. The vehicle of claim 1, wherein the output includes instruction for a driver of the vehicle to reposition the vehicle when interference of the door with the obstacle is expected.

5. The vehicle of claim 1, wherein the plurality of sensors comprises at least one of an ultrasonic sensor, radar sensor and an imaging camera.

6. The vehicle of claim 1, wherein the door comprises a powered door having an actuator, wherein the powered door pivots about a hinge assembly along a swing path.

7. The vehicle of claim 6, wherein the vehicle comprises a plurality of powered doors.

8. The vehicle of claim 6, wherein the actuator comprises an electric motor.

9. The vehicle of claim 6, wherein the controller further determines a location of the one or more potential passengers and actuates the powered door to an open position when the at least one or more potential passengers attempt to enter the vehicle.

10. A vehicle having powered door assist, the vehicle comprising:
    a plurality of powered doors, each powered door having an actuator for moving the door between closed and open door positions;
    a plurality of sensors located on the vehicle for sensing objects proximate to the vehicle including one or more objects indicative of one or more potential passengers expected to enter the vehicle and for sensing an obstacle within a swing path of at least one of the plurality of powered doors and generating a sensed signal; and
    a controller processing the sensed signals generated by the plurality of sensors, determining an estimated weight of the one or more potential passengers expected to enter the vehicle, detecting expected height of each of the plurality of powered doors with the estimated weight added to the vehicle, detecting height of a sensed obstacle within the swing path of one of the powered doors and determining whether the one of the powered doors will contact the sensed obstacle in the swing path, wherein the vehicle determines the estimated weight of the one or more potential passengers by processing one or more images acquired with an imaging device and comparing the one or more images with size parameters to determine the estimated weight of the one or more passengers, the controller generating an output based on the sensed obstacle in the swing path of the door expected to contact the door.

11. The vehicle of claim 10, wherein the output includes instructions for the one or more potential passengers to enter the vehicle from another door that is clear of the obstacle.

12. The vehicle of claim 10, wherein the output includes instruction for a driver of the vehicle to reposition the vehicle when interference on the one of the powered doors with the obstacle is expected.

13. The vehicle of claim 10, wherein the plurality of sensors comprises at least one of an ultrasonic sensor, radar sensor and an imaging camera.

14. The vehicle of claim 10, wherein the powered doors comprise passenger doors that pivot about a hinge assembly.

15. The vehicle of claim 10, wherein the actuator comprises an electric motor.

16. The vehicle of claim 10, wherein the controller further determines a location of the one or more potential passengers and actuates at least one of the powered doors to an open door position when the one or more potential passengers attempt to enter the vehicle.

17. A method of assisting a vehicle having a powered door, the method comprising the steps of:
    providing a plurality of powered doors, each powered door having an actuator for moving the door between closed and open door positions;
    sensing with a plurality of sensors located on the vehicle objects proximate to the vehicle including one or more objects indicative of one or more potential passengers expected to enter the vehicle and for sensing an obstacle within a path of at least one of the plurality of powered doors;
    processing with a controller the sensed signals generated by the plurality of sensors;
    determining an estimated weight of the one or more potential passengers expected to enter the vehicle;
    detecting an expected height of the at least one of the plurality of powered doors with the estimated weight added to the vehicle;
    detecting height of a sensed obstacle within the path of the at least one of the plurality of powered doors and determining whether the at least one of the plurality of powered doors is expected to contact the sensed obstacle in the path, wherein the vehicle determines the estimated weight of the one or more potential passengers by processing one or more images acquired with an imaging device and comparing the one or more images with size parameters to determine the estimated weight of the one or more potential passengers; and
    providing an output based on the sensed obstacle in the path expected to contact the door.

18. The method of claim 17, wherein the output includes instructions for the one or more potential passengers to enter the vehicle from another door that is clear of the obstacle.

19. The method of claim 17, wherein the output includes instruction for a driver of the vehicle to reposition the vehicle when contact is expected.

20. The method of claim 17, wherein the plurality of sensors comprises at least one of an ultrasonic sensor, radar sensor and an imaging camera.

* * * * *